United States Patent
Ali (10) Patent No.: US 8,631,385 B2
(45) Date of Patent: Jan. 14, 2014

(54) OPTIMIZING CODE GENERATION SYSTEM WITH INPUT DATA INTEGRATION

(75) Inventor: Amr K. Ali, Giza (EG)

(73) Assignee: International Business Machines Corporation, Armonk, NY (US)

( * ) Notice: Subject to any disclaimer, the term of this patent is extended or adjusted under 35 U.S.C. 154(b) by 1359 days.

(21) Appl. No.: 12/393,160

(22) Filed: Feb. 26, 2009

(65) Prior Publication Data

US 2010/0218165 A1    Aug. 26, 2010

(51) Int. Cl.
*G06F 9/44* (2006.01)

(52) U.S. Cl.
USPC .............. 717/104; 717/106; 717/109

(58) Field of Classification Search
USPC ......................... 717/104, 106, 109
See application file for complete search history.

(56) References Cited

U.S. PATENT DOCUMENTS

| | | | |
|---|---|---|---|
| 5,675,801 A | 10/1997 | Lindsey | |
| 6,353,925 B1 * | 3/2002 | Stata et al. | 717/112 |
| 7,392,504 B2 | 6/2008 | Gownder et al. | |
| 8,028,276 B1 * | 9/2011 | Bessonov | 717/124 |
| 2002/0026632 A1 | 2/2002 | Fuchs et al. | |
| 2003/0208743 A1 * | 11/2003 | Chong et al. | 717/106 |

FOREIGN PATENT DOCUMENTS

| | | |
|---|---|---|
| EP | 0817033 A2 | 1/1998 |
| GB | 2367391 A | 4/2002 |
| JP | 2007079906 | 3/2007 |

* cited by examiner

*Primary Examiner* — Chat Do
*Assistant Examiner* — Lynda Dinh
(74) *Attorney, Agent, or Firm* — Schmeiser, Olsen & Watts, LLP; Alvin Borromeo (57) ABSTRACT

A code generation system is optimized by integrating input data. An input code to the code generation system has a program code and an annotation. The program code is a program text to be automated by the code generation system. The annotation has code generating instructions to process the program code. An input code parser generates a template that parameterizes texts of the program code for automatically generating an output code. The input code parser produces a model to instantiate parameterized program code for each parameter. The template is used as inputs to a template engine of the code generation system and produces a code generator. An output code is created by applying the model to the code generator.

12 Claims, 9 Drawing Sheets

```
E01:    package gen.test;

E02:    public class TestClass
E03:    {
E04:            public int someProperty;

E05:            public int getSomeProperty;
E06:            {
E07:                    return someProperty;
E08:            }

E09:            public void setSomeProperty (int someProperty)
E10:            {
E11:                    this.someProperty = someProperty;
E12:            }
E13:    }
```

FIG. 3A

```
E101:   /**
E102:    * @replace "gen.test" with model.getPackageName()
E103:    */
E104:   package gen.test;

E105:   /**
E106:    * @replace "TestClass" with model.getClassName()
E107:    */
E108:   public class TestClass
E109:   {
E110:       /**
E111:        * @for (Property prop : model.getProperties())
E112:        * {
E113:        * @replace "public" with prop.getModifier()
E114:        * @replace "int" with prop.getType()
E115:        * @replace "someProperty" with prop.getName()
E116:        * @replace "SomeProperty" with
E117:        *     model.capitalize(prop.getName())
E118:        */
E119:       public int someProperty;

E120:       public int getSomeProperty;
E121:       {
E122:           return someProperty;
E123:       }

E124:       public void setSomeProperty (int someProperty)
E125:       {
E126:           this.someProperty = someProperty;
E127:       }
E128:       /**
E129:        * } //end for
E130:        */

```
E201:   <%@ jet package="gen.test" imports="gen.model.*"
E202:   class="GettersSettersGenerator" %>

E203:   <% Model model=(Model) argument;%>

E204:   package <%= model.getPackageName()%>

E205:   public class <%= model.getClassName()%>
E206:   {
E207:       <%@for (Property prop : model.getProperties())
E208:       {%>
E209:       <%=prop.getModifier()%>
E210:       <%=prop.getType()%>
E211:       <%=prop.getName()%>;

E212:       public <%=prop.getType()%>
E213:        get<%= model.capitalize(prop.getName())%>()
E214:       {
E215:           return <%=prop.getName()%>;
E216:       }

E217:       public void
E218:        set<%=
E219:   model.capitalize(prop.getName())%>(<%=prop.getType()%>
E220:   <%=prop.getName()%>)
E221:       {
E222:           this.<%=prop.getName()%> =
E223:           <%=prop.getName()%>;
E224:       }
E225:       <%} //end for %>

```
E301:   package gen.test;
E302:   import gen.model.*;
E303:   public class GettersSettersGenerator
E304:   {
E305:      protected final String NL =
E306:   System.getProperties().getProperty("line.separator");
E307:      protected final String TEXT_1 = NL + "package ";
E308:      protected final String TEXT_2 = NL + NL + "public
E309:   class ";
E310:      protected final String TEXT_3 = NL + "{" + NL + "\t ";
E311:      protected final String TEXT_4 = NL + "\t";
E312:      protected final String TEXT_5 = " ";
E313:      protected final String TEXT_6 = " ";
E314:      protected final String TEXT_7 = ";" + NL + "" + NL +
E315:   "\tpublic ";
E316:      protected final String TEXT_8 = " get";
E317:      protected final String TEXT_9 = "()" + NL + "      {"
E318:   + NL + "\t\treturn ";
E319:      protected final String TEXT_10 = ";" + NL + "      }"
E320:   + NL + "\t" + NL + "\tpublic void set";
E321:      protected final String TEXT_11 = "(";
E322:      protected final String TEXT_12 = " ";
E323:      protected final String TEXT_13 = ")" + NL + " {" + NL
E324:   + "          \tthis.";
E325:      protected final String TEXT_14 = "; = ";
E326:      protected final String TEXT_15 = ";;" + NL + "   }" +
E327:   NL + "\t";
E328:      protected final String TEXT_16 = "\t" + NL + "}";
E329:      protected final String TEXT_17 = NL;
```

FIG. 3E

```
E330:       public String generate(Object argument)
E331:       {
E332:          final StringBuffer stringBuffer = new
E333:       StringBuffer();
E334:           Model model = (Model) argument;
E335:          stringBuffer.append(TEXT_1);
E336:          stringBuffer.append(model.getPackageName());
E337:          stringBuffer.append(TEXT_2);
E338:          stringBuffer.append(model.getClassName());
E339:          stringBuffer.append(TEXT_3);
E340:          for(Property prop : model.getProperties())
E341:             {
E342:          stringBuffer.append(TEXT_4);
E343:       stringBuffer.append(prop.getModifier());
E344:          stringBuffer.append(TEXT_5);
E345:       stringBuffer.append(prop.getType());
E346:          stringBuffer.append(TEXT_6);
E347:       stringBuffer.append(prop.getName());
E348:          stringBuffer.append(TEXT_7);
E349:       stringBuffer.append(prop.getType());
E350:             stringBuffer.append(TEXT_8);
E351:             stringBuffer.append(model.capitalize(prop.getName(
E352:             )));
E353:          stringBuffer.append(TEXT_9);
E354:       stringBuffer.append(prop.getName());
E355:             stringBuffer.append(TEXT_10);
E356:             stringBuffer.append(model.capitalize(prop.getName(
E357:             )));
E358:          stringBuffer.append(TEXT_11);
E359:       stringBuffer.append(prop.getType());
E360:          stringBuffer.append(TEXT_12);
E361:       stringBuffer.append(prop.getName());
E362:          stringBuffer.append(TEXT_13);
E363:       stringBuffer.append(prop.getName());
E364:          stringBuffer.append(TEXT_14);
E365:       stringBuffer.append(prop.getName());
E366:          stringBuffer.append(TEXT_15);
E367:          }    stringBuffer.append(TEXT_16);
E368:       stringBuffer.append(TEXT_17);
E369:          return stringBuffer.toString();
E370:       }
E371:    }
```

OPTIMIZING CODE GENERATION SYSTEM WITH INPUT DATA INTEGRATION

BACKGROUND

The present invention relates to improving quality and efficiency of conventional code generation methods.

Conventional code generation methods facilitate programmers to write programs more efficiently in various manners. Using code generation methods, programmers can produce programs of high quality and consistent program interfaces. Programs produced by code generation methods can be easily rebuilt and modified in shorter development cycles than conventional programming. Also, by defining input data as templates for code generation methods, programmers can achieve high level of abstraction of programs without limitations imposed by a specific programming language, which result in greater portability and readability of generated programs.

BRIEF SUMMARY

According to one embodiment of the present invention, a method for a code generation system comprises receiving an input code, parsing the input code, generating a model, producing a template, and transferring the model and the template to an output device. The method receives the input code that comprises a program code and an annotation, wherein the program code is a text describing a computer program in a programming language, wherein the annotation is a set of comments in the programming language of the program code, and wherein the annotation comprises at least one code generating instruction. The method, using a processor, parses the input code into data items of the program code and data items of the at least one code generating instruction. The method generates the model that comprises the parsed data items of the program code such that the generated model represents all parameters in the program code. The method produces the template as a result of applying the at least one code generation instruction to the parsed data items of the program code such that the template comprises a respective variable that holds a respective instance of the generated model for each parameter in the program code. The method transfers the generated model and the produced template to at least one output device.

According to one embodiment of the present invention, a computer program product comprises a computer readable storage medium that embodies a computer readable program code. The computer readable program code contains instructions that, when executed by a processor of a computer system, implement a method for a code generation system.

According to one embodiment of the present invention, a computer system comprises a processor and a computer readable storage medium coupled to the processor, wherein the computer readable storage medium containing instructions that, when executed by the processor, implement a method for a code generation system.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable storage medium(s) may be utilized. The computer-readable storage medium is not a computer readable signal medium. A computer-readable storage medium may be, for example, but not limited to, an electronic, magnetic, optical, or semiconductor system, apparatus, a device, or any suitable combination of the foregoing. More specific examples (a non-exhaustive list) of the computer- readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal for example, in baseband or as part of a carrier wave. Such a propagated signal may take any of a variety of forms, including, but not limited to, electro-magnetic, optical, or any suitable combination thereof.

Program code embodied on a computer-readable medium may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
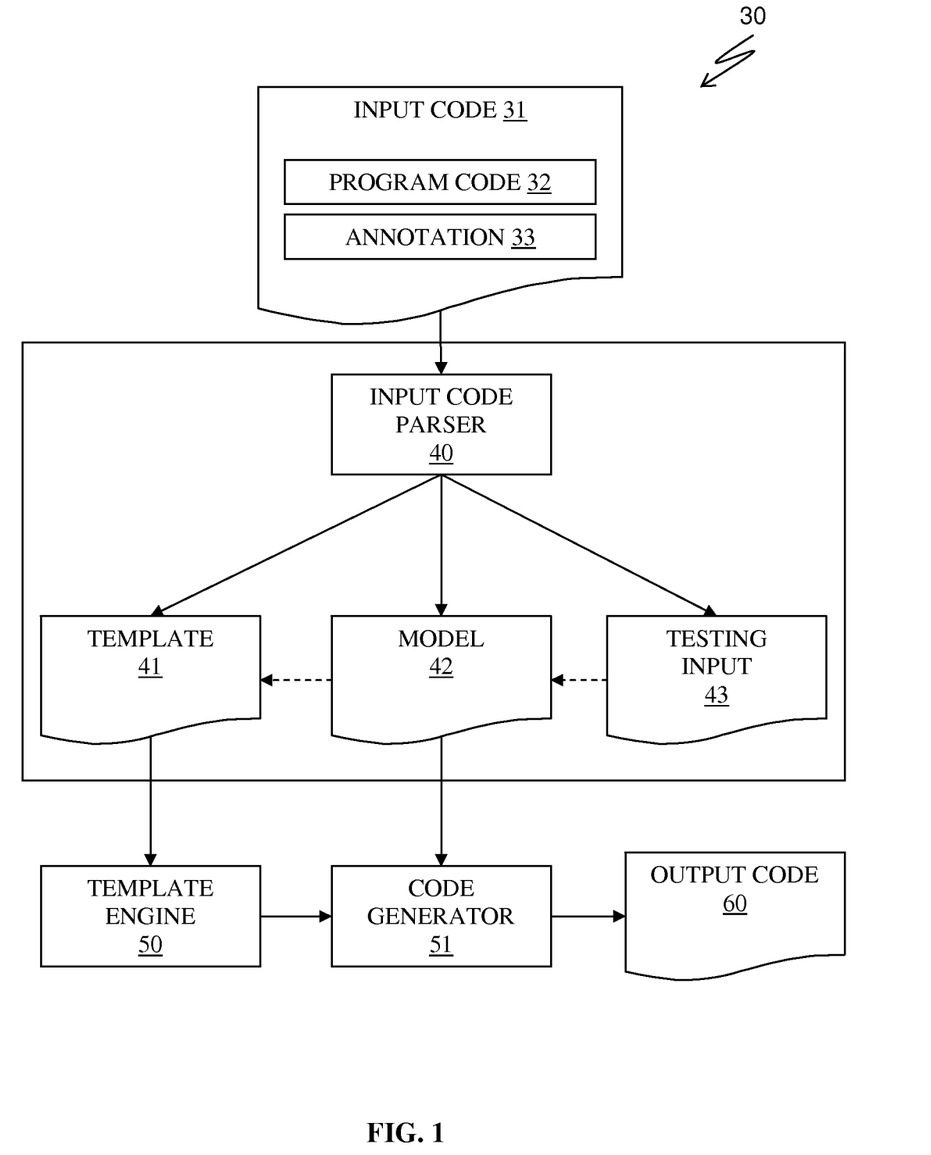
FIG. 1 illustrates a system for optimizing a code generation system with an integrated input data, in accordance with embodiments of the present invention.

FIG. 1 illustrates a system 30 for optimizing a code generation system with integrated input data, in accordance with embodiments of the present invention.

The system 30 comprises an input code 31, an input code parser 40, a template 41, a model 42, a testing input 43, a template engine 50, a code generator 51, and an output code 60.

The input code 31 is the integrated input data comprising a program code 32 and an annotation 33. The program code 32 of the input code 31 implements a solution to a specific problem developed by a programmer. The program code 32 is a body of a sample program to be processed in the system 30. The program code 32 may be written in any programming language that permits comments or meta-tags in which the annotation 33 is presented. Examples of programming languages used for the program code 32 may be, inter alia, Java, C++, C#, eXtended Markup Language (XML), Structured Query Language (SQL), Hypertext Markup Language (HTML), etc.

The annotation 33 of the input code 31 comprises code generating instructions for the input code parser 40 to produce the template 41 and the model 42. The annotation 33 is integrated with the program code 32 as comments that are not processed as a part of the program code 32. See FIG. 3B, infra, for an embodiment of the input code 31.

The input code parser 40 processes and tokenizes the program code 32 of the input code 31 and produces the template 41, the model 42, and the testing input 43. The input code parser 40 parses code generation instructions provided in the annotation 33 and then applies the parsed code generation instructions to the program code 32 to generate the template 41, the model 42, and the testing input 43.

The template 41 is a text derived from the program code 32 by tokenizing parameters of the program to which the model 42 should be applied as the input. In this specification, the term "tokenizing" means replacing fixed parameters of the program code 32 with variables represented in the model 42 such that the code generation system generates a respective output code for an instance of the model 42.

The model 42 is data representing all parameters in the program code 32 that are specific to the program code 32. The model 42 is referred to by the template 41, and used as input to the code generator 51.

The testing input 43 is another program code similar to the program code 32 of the input code 31. The testing input 43 is generated for testing whether the annotation 33 is applicable to various program codes.

The template engine 50 is an executable program that receives the template 41 as input data and generates a code generator 51. The template engine 50 may be, inter alia, a conventional template engine such as the Eclipse™ Java®-JET (Java Emitter Templates) template engine/code generator, etc. (Eclipse is a trademark of the Eclipse Foundation, Inc., in the United States or other countries; Java is a registered trademark of the Sun Microsystems, Inc., in the United States or other countries.) The template engine 50 transmits the code generator 51 to an output device. The output device may be, inter alia, a display device to communicate the code generator 51 with a user, a computer readable storage medium to store the code generator 51 to execute the code generator 51, etc.

The code generator 51 is produced as a result of processing the template 41 by the template engine 50. The code generator 51 defines token strings appearing in an output code 60 and a procedure that automatically generates the output code 60. The code generator 51 uses the model 42 as an input.

The output code 60 is a result created by executing the code generator 51 using the model 42 produced by the input code parser 40 as an input. The output code 60 is a derivation of the program code 32 having parameters and instances specified in the model 42. The output code 60 is generated in the same programming language as the program code 32 of the input code 31. The output code 60 is communicated to the user of the code generation system.

In the conventional code generation system, a sample code, a model, and a template are manually created by the programmer independently from one another. Consequently, the sample code, the model, and the template should be manually synchronized and such manual synchronization of various input documents causes inconsistency and inefficiency in overall code generation methods. The method of the present invention overcomes disadvantages of conventional code generation methods by integrating various input documents into the input code and by automatically producing the template and the model from the input code. Consequently, the method of the present invention eliminates difficulties in synchronizing various input documents during developing a correct set of input documents. A user of the method of the present invention can easily revise the template and the model by debugging only the input code, which is in a more familiar programming language than the template.

Figure 2:
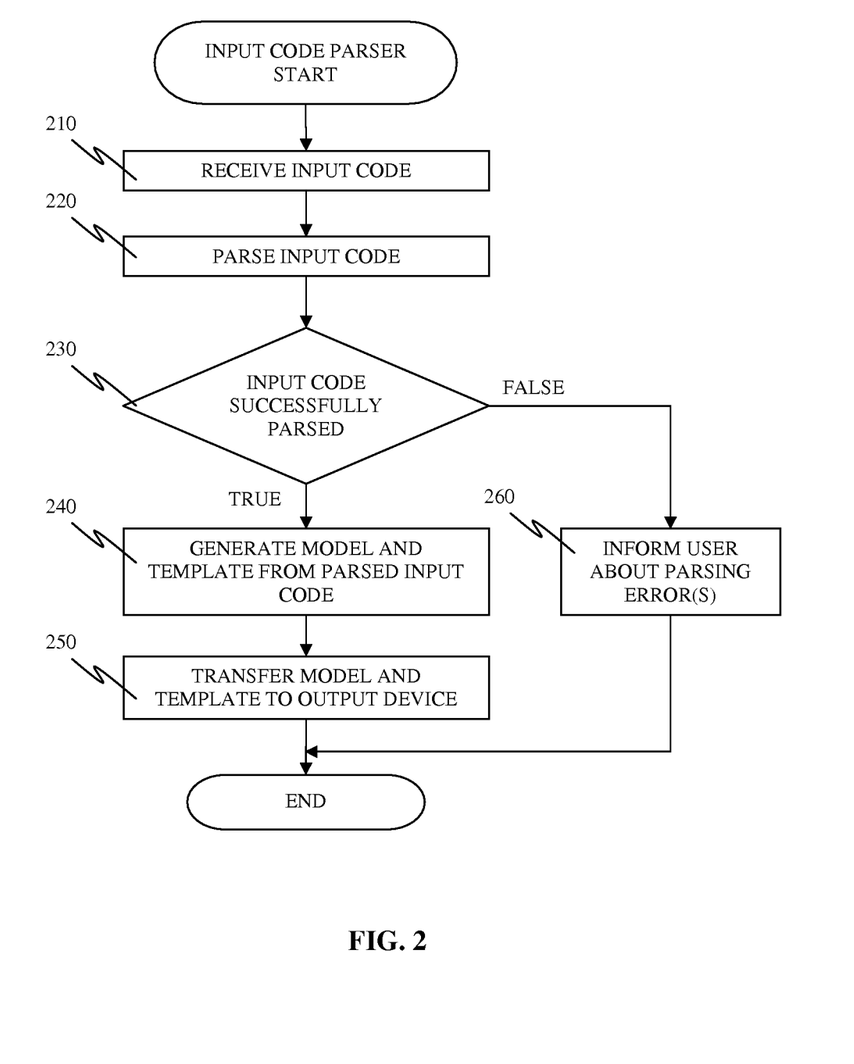
FIG. 2 is a flowchart depicting a method for optimizing a code generation system with an integrated input data, in accordance with the embodiments of the present invention.

FIG. 2 is a flowchart depicting a method for optimizing a code generation system with an integrated input data, in accordance with the embodiments of the present invention.

In step 210, the input code parser receives an input code that integrates input data for the code generation system. The input code comprises a program code and an annotation. The program code of the input code is a text describing a computer program in a programming language. The annotation comprises at least one code generating instruction formatted as comments in the programming language of the program code.

In step 220, the input code parser parses the input code into respective data items of the program code and the annotation. The data items of the program code are parameterized and the at least one code generating instruction are separated from the input code according to associated syntax and semantics of the programming language.

In step 230, the input code parser determines whether the input code is successfully parsed. If the input code parser determines that the input code had failed, the input code parser proceeds with step 260 to terminate. If the input code parser determines that the input code is successfully parsed, the input code parser proceeds with step 240.

In step 240, the input code parser generates a model and a template from the parsed input code. The model represents all parameters in the program code. The model is specific to an instance of the program code. The template is a result of applying the code generation instructions to data items the program code. Each instance of the model is represented in the template as a respective variable. See FIG. 3D, infra, for an example of the template.

In other embodiment of the present invention, the input code parser also generates a testing input from the parsed input code. The testing input employs data items that are interchangeable with data items of the program code to test each code generating instruction.

In step 250, the input code parser transfers the model and the template to an output device. The output device may be, inter alia, a display device to communicate the model and the template to the user, a computer readable storage medium to store the model and the template for further processing, or both. See the description of FIG. 1, supra, for details of further processing.

In step 260, the input code parser informs a user of the input code parser about at least one parsing error that had caused the failure to enable the user to revise the input code for a successful parsing in another repetition of the method.

FIGS. 3A, 3B, 3C, 3D, and 3E illustrate examples of a program code, an input code, a model, a template, and a code generator, respectively, for various stages of developing the code generator.

Figure 3A:
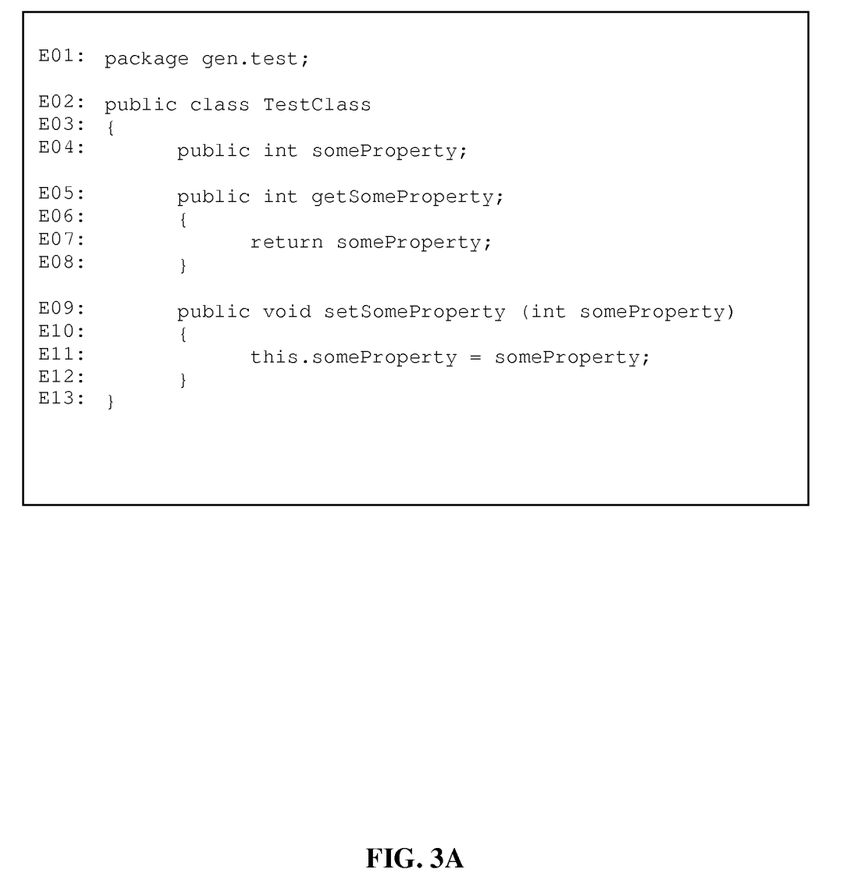
FIG. 3A is an example of a program code of an input code to produce getters and setters for properties of a Java class, in accordance with the embodiments of the present invention.

FIG. 3A is an example of a program code of an input code to produce getters and setters for properties of a Java class, in accordance with the embodiments of the present invention.

In this embodiment of the present invention, the program code is written in the Java programming language. The program code defines a Java class referred to as TestClass that has a property referred to as SomeProperty.

Line E01 describes that the class TestClass is in a Java package gen.test.

Lines E02 to E13 define the class TestClass. Within the class, line E04 declares the property SomeProperty.

Lines E05 to E08 define a getter method for the property SomeProperty that returns a value of the property SomeProperty to a method that had invoked the getter method.

Lines E09 to E12 define a setter method for the property SomeProperty that assigns a value of the property SomeProperty to the property SomeProperty of the current instance of the class.

Figure 3B:
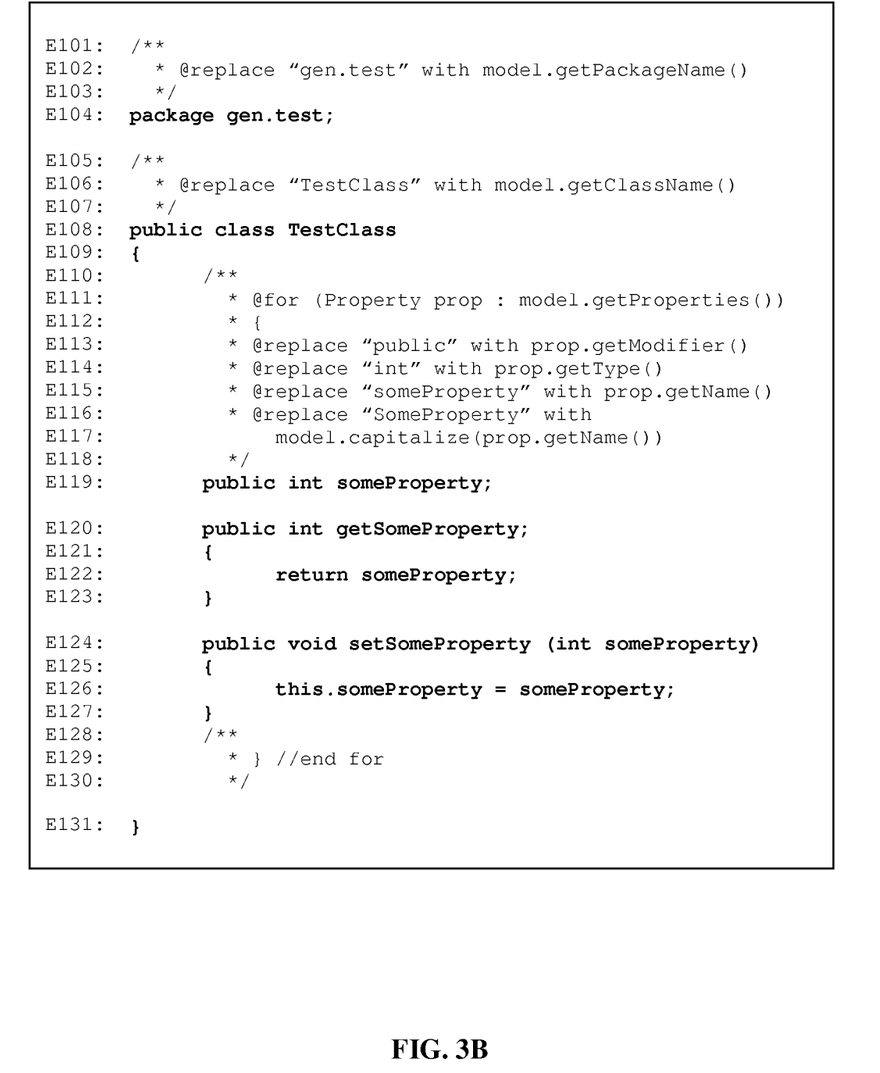
FIG. 3B is an example of the input code that comprises the program code of FIG. 3A, and an annotation, in accordance with the embodiments of the present invention.

FIG. 3B is an example of the input code that comprises the program code of FIG. 3A, supra, and an annotation, in accordance with the embodiments of the present invention.

The annotation of the input code comprises code generating instructions which generates a model associated with the Java code. Code generating instructions are embedded using comment syntax of Java programming language. Each code generating instruction starts with a special mark that is recognizable by the input code parser. The special mark may be, inter alia, "@" as shown in Lines E102, E106, E111, E113, E114, E115, and E116. Any portion of the program code can be parameterized for code generation. Examples of program code portion may be, inter alia, methods, classes, package declarations, fields, for-loops, if-statements, etc.

Line E102 directs the input code parser to replace a package name in the sample code "gen.test" with a value returned from a method model.getPackageName( ).

Line E106 directs the input code parser to replace a class name in the sample code "TestClass" with a value returned from a method model.getClassName( ).

Lines E111 to E117 directs the input code parser how to replace each property of model.getClassName( ).

The input code parser parses line E111 and recognizes that a List exists inside the model and that the List holds data items a class type Property. The input parser creates an instance prop of the class type Property and adds an attribute inside the model class that has type of the List Property.

Line E113 directs the input code parser to replace "public" modifier with a value returned from a method prop.getModifier( ).

Line E114 directs the input code parser to replace "int" type declaration with a value returned from a method prop.getType( ).

Line E115 directs the input code parser to replace "someProperty" name with a value returned from a method prop.getName( ).

Lines E116 to E117 directs the input code parser to replace "someProperty" name with a value returned from a method model.capitalize(prop.getName( )). A method capitalize( ) is defined in the model to capitalize an input String argument.

Figure 3C:
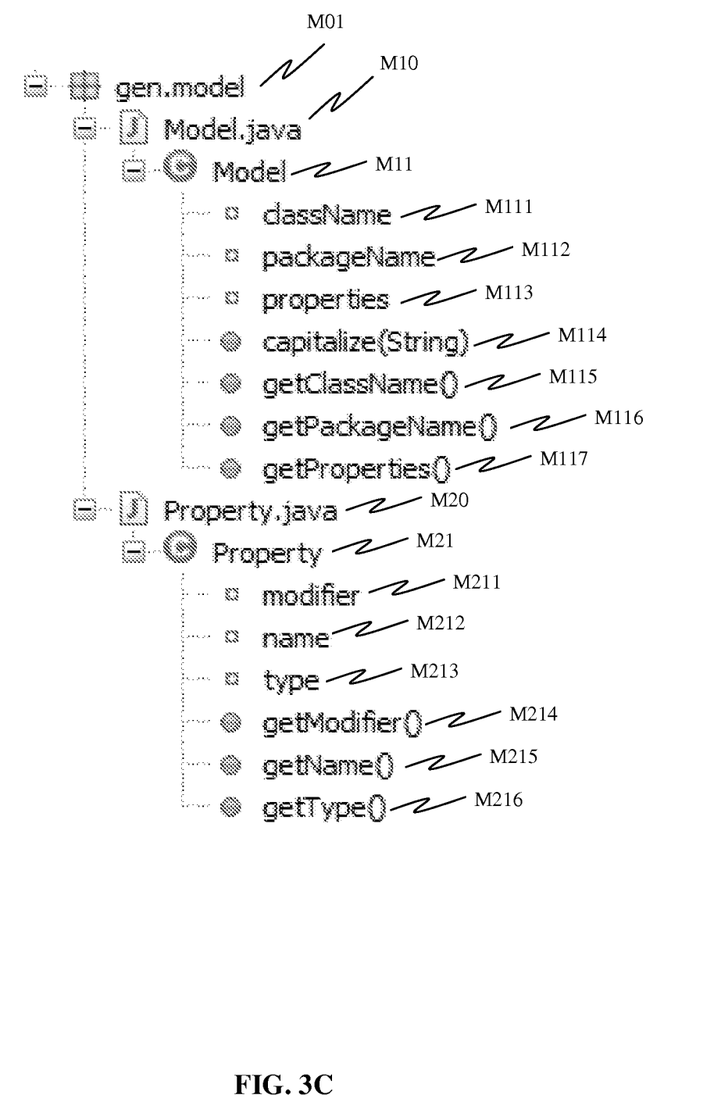
FIG. 3C is an example of the model produced by executing the code generating instructions of FIG. 3B, in accordance with the embodiments of the present invention.

FIG. 3C is an example of the model produced by executing the code generating instructions of FIG. 3B, supra, in accordance with the embodiments of the present invention.

A data item "gen.model" M01 indicates a package of at least one model file that had been produced.

A data item "Model.java" M10 indicates a first model file in the package.

A data item "Model" M11 indicates a first model class inside the first model file.

A data item "className" M111 indicates a string property that holds the name of the first model class.

A data item "packageName" M112 indicates a string property that holds the name of the package.

A data item "properties" M113 indicates a list that holds all the properties of the first model class.

A data item "capitalize (String) " M114 indicates a method of the first model class for capitalizing a first letter of a given string "String."

A data item "getClassName( )" M115 indicates a getter method of the first model class for obtaining the className property.

A data item "getPackageName( )" M116 indicates a getter method of the first model class for obtaining the package-Name property.

A data item "getProperties( )"M117 indicates a getter method of the first model class for obtaining the properties property.

A data item "Property.java" M20 indicates a second model file. The "properties" list M113 holds instances of the second model file "Property.java"M20.

A data item "Property" M21 indicates a second model class in the second model file "Property.java" M20.

A data item "modifier" M211 indicates a string property that holds a modifier of the "Property" M21.

A data item "name" M212 indicates a string property that holds a name of the "Property" M21.

A data item "type" M213 indicates a string property that holds a type of the "Property" M21.

A data item "getModifier( )" M214 indicates a getter method for obtaining the modifier of a class in which the getModifier( ) method is invoked.

A data item "getName( )" M215 indicates a getter method for obtaining the name of a class in which the getName( ) method is invoked.

A data item "get Type( )" M216 indicates a getter method for obtaining the type of a class in which the getName( ) method is invoked.

Figure 3D:
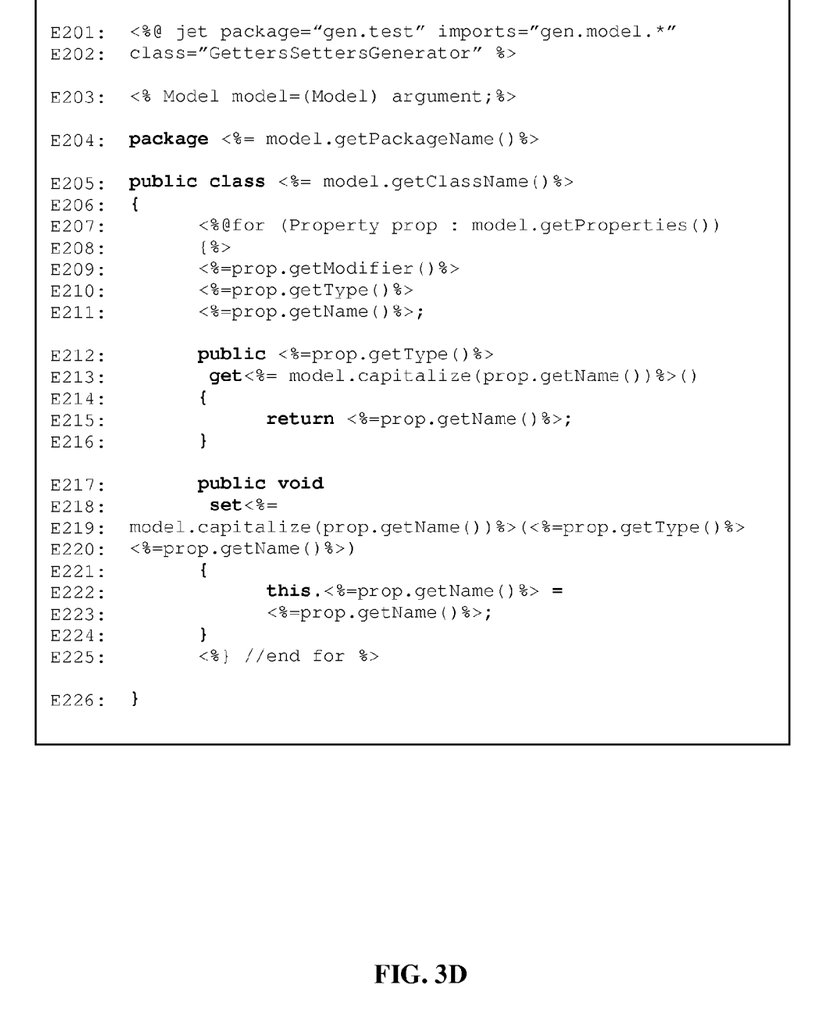
FIG. 3D illustrate an example of a template created by the input code parser upon the input code of FIG. 3B, in accordance with the embodiments of the present invention.

FIG. 3D illustrate an example template created by the input code parser upon the input code of FIG. 3B, supra, in accordance with the embodiments of the present invention.

The example template of FIG. 3D is generated to be used as an input to the Eclipse Java-JET template engine. A for mat of a template may vary pursuant to a type of a template engine employed in an embodiment of the present invention.

Lines E201 and E202 direct the Eclipse Java-JET template engine to generate outputs of a package "gen.test" and a class "GetterSetterGenrator" by importing a model "gen.model.*."

Line E203 defines a variable "model " that will be referenced during the processing of the example template.

Line E204 declares the package name that is to be retrieved from a model method getPackageName( ).

Lines E205 is E226 are a class declaration followed by contents of the declared class.

Lines E207 to E225 define generation procedures to be performed by the Eclipse Java-JET template engine to produce all class property listed in the model.

Lines E209 to E211 define a class property by generating a modifier, a property type, and a property name in Lines E209, E210, and E211, respectively.

Lines E212 to E216 generate a getter method that obtains the name of the property for the class property generated in Lines E207 to E211.

Lines E217 to E224 generate a setter method that assigns the name of the property for the class property generated in Lines E207 to E211.

Figure 3E:
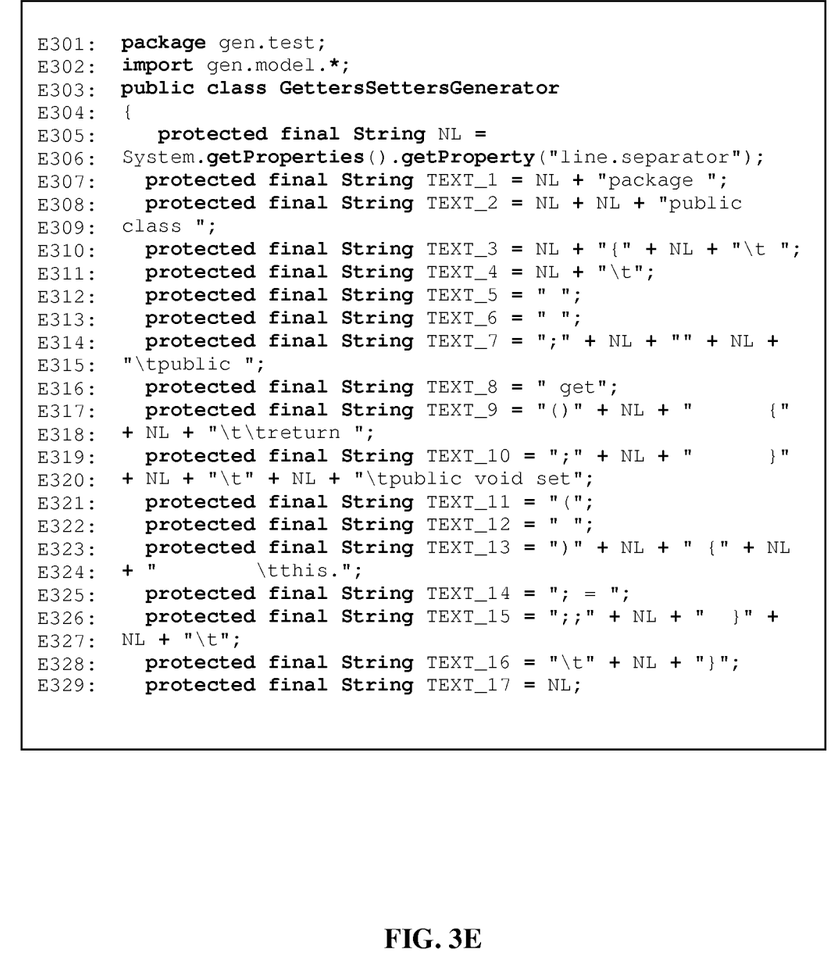
FIG. 3E illustrate an example of a code generator created by the template engine upon the template of FIG. 3D, in accordance with the embodiments of the present invention.

FIG. 3E illustrate an example code generator created by the template engine upon the template of FIG. 3D, supra, in accordance with the embodiments of the present invention.

The example code generator is produced as a result of running the Eclipse Java-JET template engine/code generator with the example template of FIG. 3D, supra, as an input. The example code generator takes a model "gen.model.*" and produces an output code.

Line E301 defines a package name as "gen.test."

Line E302 imports model files with a respective name beginning with "gen.model." The imported model files are referenced in a class GettersSettersGenerator defined in lines E303 to E371 of FIG. 3E, which represents the example code generator produced by the Eclipse Java-JET template engine.

Lines E305 and E306 retrieve a new line mark, which differs pursuant to a computer system employed in an embodiment.

In lines E307 to E329, for all static strings that are defined in the example template file, the Eclipse Java-JET template engine defines a respective class member in the class Getters-SettersGenerator. A static string is a string that is not subject to changes based on parameters in the model stored in the imported model files. Each protected final String has a respective name "TEXT_*," where * stands for a sequence number of the protected final string such that the example code generator uniquely identifies each produced protected final String.

In lines E330 to E370, a generator method generate( ) of the class GettersSettersGenerator is defined. The generator method generate( ) accepts a parameter Object argument that is an instance of the model stored in the imported model files.

Lines E332 to E334 define an object StringBuffer that holds the output code generated by the method generate( ). In line E334, the method generate( ) casts the parameter Object argument to a model file model.

Lines E335 to E336 generate a string declaring a package having a name obtained as a result of calling a method model.getPackageName( ).

Lines E337 to E338 generate a string declaring a class having a name obtained as a result of calling a method model.getClassName( ).

Line E339 appends a protected final Sting TEXT_3 that is defined in line E310 to begin a class body definition in the output code.

Lines E340 to E367 generate a respective string that declares each property of the model file model obtained as a result of calling a method model.getProperties( ). For each property, the method generate( ) generates stings holding a property modifier, a property type, a property name, a getter method of the property, and a setter method of the property.

Figure 4:
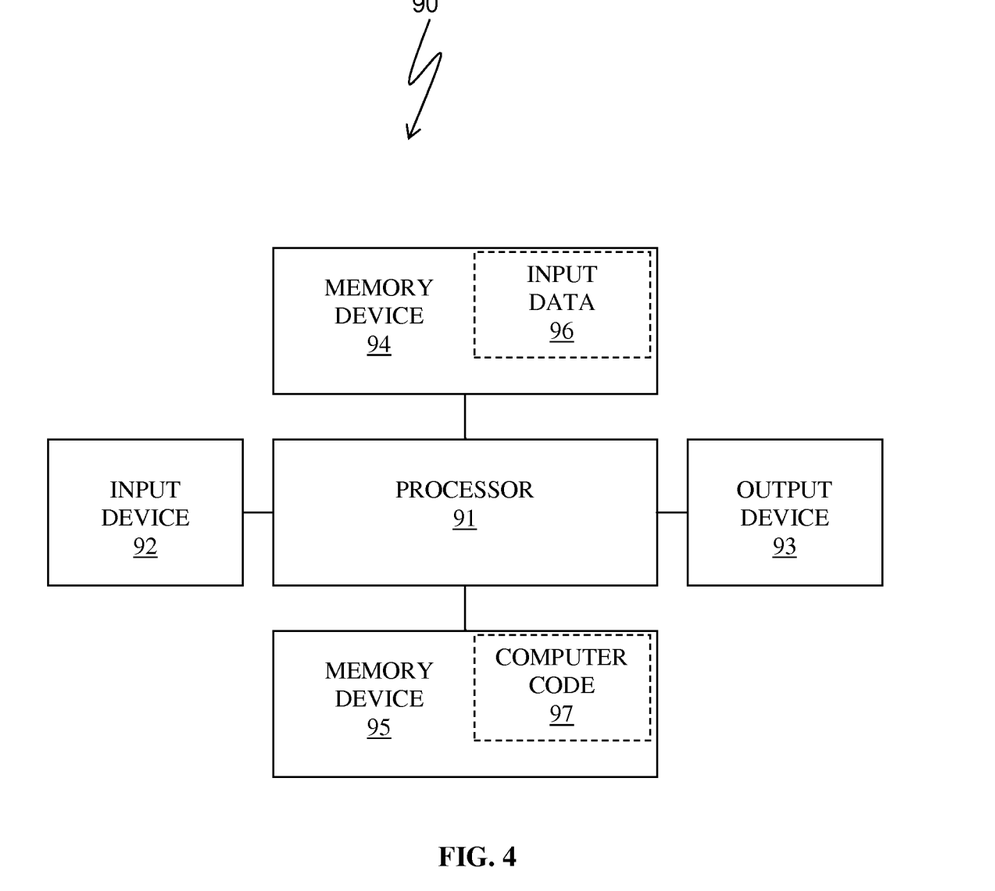
FIG. 4 illustrates a computer system used for optimizing a code generation system with an integrated input data, in accordance with embodiments of the present invention.

FIG. 4 illustrates a computer system 90 used for optimizing a code generation system with an integrated input data, in accordance with the embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be any, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for optimizing a code generation system with the integrated input data according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said computer readable storage medium or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a code generation system, said method comprising:
    parsing, by a processor of a computer system, input code into data items of program code and data items of at least one code generating instruction, said input code comprising the program code and a set of comments in the programming language of the program code such that the set of comments includes the at least one code generating instruction;
    said processor generating a model comprising the parsed data items of the program code such that the generated model represents all parameters in the program code;
    said processor generating a template as a result of applying said at least one code generation instruction to the parsed data items of the program code such that the template comprises a respective variable that holds a respective instance of the generated model for each parameter in the program code;
    said processor obtaining a code generator as a result of running a template engine of the code generation system using the generated template, wherein said code generator comprises at least one definition of a respective string and at least one procedure;
    said processor creating an output code of the code generation system as a result of running the obtained code generator using the at least one procedure, the at least one definition of the respective string, and a respective instance of the generated model, wherein the output code comprises parameters in the generated model; and
    said processor forwarding the created output code to at least one output device.

2. The method of claim 1, wherein the input code is parsed by a parser configured to create a testing input from the parsed input code, wherein the testing input employs data items that are interchangeable with data items of the program code of the input code such that said at least one code generating instruction can be tested on data items of the testing input.

3. The method of claim 1, wherein the programming language of the program code accommodates comments in the syntax of the programming language such that said at least one code generating instruction is embedded in said comments of the programming language.

4. The method of claim 1, wherein said at least one output device comprises at least one of a computer readable storage device and a display device.

5. A computer program product comprising a computer readable storage medium having a computer readable program code embodied therein, said storage medium not comprising a signal, said computer readable program code containing instructions configured to be executed by a processor of a computer system to implement a method for a code generation system, said method comprising:
    said processor parsing the input code into data items of program code and data items of at least one code generating instruction, said input code comprising the program code and a set of comments in the programming language of the program code such that the set of comments includes the at least one code generating instruction;
    said processor generating a model comprising the parsed data items of the program code such that the generated model represents all parameters in the program code;

said processor generating a template as a result of applying said at least one code generation instruction to the parsed data items of the program code such that the template comprises a respective variable that holds a respective instance of the generated model for each parameter in the program code;

said processor obtaining a code generator as a result of running a template engine of the code generation system using the generated template, wherein said code generator comprises at least one definition of a respective string and at least one procedure;

said processor creating an output code of the code generation system as a result of running the obtained code generator using the at least one procedure, the at least one definition of the respective string, and a respective instance of the generated model, wherein the output code comprises parameters in the generated model; and said processor forwarding the created output code to at least one output device.

6. The computer program product of claim 5, wherein the input code is parsed by a parser configured to create a testing input from the parsed input code, wherein the testing input employs data items that are interchangeable with data items of the program code of the input code such that said at least one code generating instruction can be tested on data items of the testing input.

7. The computer program product of claim 5, wherein the programming language of the program code accommodates comments in the syntax of the programming language such that said at least code generating instruction is embedded in said comments of the programming language.

8. The computer program product of claim 5, wherein said at least one output device comprises at least one of a computer readable storage device and a display device.

9. A computer system comprising a processor, a memory coupled to the processor, and a computer readable storage medium coupled to the processor, said computer readable storage medium containing instructions that when executed by the processor via the memory implement a code generation system, said method comprising:

said processor parsing the input code into data items of program code and data items of at least one code generating instruction, said input code comprising the program code and a set of comments in the programming language of the program code such that the set of comments includes the at least one code generating instruction;

said processor generating a model comprising the parsed data items of the program code such that the generated model represents all parameters in the program code;

said processor generating a template as a result of applying said at least one code generation instruction to the parsed data items of the program code such that the template comprises a respective variable that holds a respective instance of the generated model for each parameter in the program code;

said processor obtaining a code generator as a result of running a template engine of the code generation system using the generated template, wherein said code generator comprises at least one definition of a respective string and at least one procedure;

said processor creating an output code of the code generation system as a result of running the obtained code generator using the at least one procedure, the at least one definition of the respective string, and a respective instance of the generated model, wherein the output code comprises parameters in the generated model; and said processor forwarding the created output code to at least one output device.

10. The computer system of claim 9, wherein the input code is parsed by a parser configured to create a testing input from the parsed input code, wherein the testing input employs data items that are interchangeable with data items of the program code of the input code such that said at least one code generating instruction can be tested on data items of the testing input.

11. The computer system of claim 9, wherein the programming language of the program code accommodates comments in the syntax of the programming language such that said at least code generating instruction is embedded in said comments of the programming language.

12. The computer system of claim 9, wherein said at least one output device comprises at least one of a computer readable storage device and a display device.

\* \* \* \* \*